US006641653B2

(12) United States Patent
Yu

(10) Patent No.: US 6,641,653 B2
(45) Date of Patent: Nov. 4, 2003

(54) INK COMPOSITIONS COMPRISING MODIFIED COLORED PIGMENTS AND METHODS FOR PREPARING THE SAME

(75) Inventor: Yuan Yu, Nashua, NH (US)

(73) Assignee: Cabot Corporation, Boston, MA (US)

( * ) Notice: Subject to any disclaimer, the term of this patent is extended or adjusted under 35 U.S.C. 154(b) by 194 days.

(21) Appl. No.: 09/909,328

(22) Filed: Jul. 19, 2001

(65) Prior Publication Data

US 2003/0024433 A1 Feb. 6, 2003

(51) Int. Cl.[7] .................... C09D 11/02; C08K 5/00
(52) U.S. Cl. ................ 106/31.6; 106/31.43; 106/31.86; 106/31.87; 106/499
(58) Field of Search ................ 106/31.6, 499, 106/31.43, 31.86, 31.87

(56) References Cited

U.S. PATENT DOCUMENTS

| | | | |
|---|---|---|---|
| 3,981,734 A | 9/1976 | Cabut et al. ................... 106/20 |
| 4,824,948 A | 4/1989 | Stark et al. ................... 540/125 |
| 4,909,852 A | 3/1990 | Atkinson ..................... 106/448 |
| 5,281,261 A | 1/1994 | Lin ........................... 106/20 R |
| 5,519,085 A | 5/1996 | Ma et al. ..................... 524/503 |
| 5,545,504 A | 8/1996 | Keoshkerian et al. ........ 430/137 |
| 5,554,739 A | 9/1996 | Belmont ...................... 534/885 |
| 5,698,016 A | 12/1997 | Adams et al. .............. 106/31.6 |
| 5,707,432 A | 1/1998 | Adams et al. .............. 106/31.6 |
| 5,714,993 A | 2/1998 | Keoshkerian et al. .......... 347/95 |
| 5,759,254 A | 6/1998 | Macpherson et al. ........ 106/410 |
| 5,788,914 A | 8/1998 | Oi et al. ..................... 252/587 |
| 5,837,045 A | 11/1998 | Johnson et al. ........... 106/31.85 |
| 5,851,280 A | 12/1998 | Belmont et al. ............. 106/472 |
| 5,895,522 A | 4/1999 | Belmont et al. ............ 106/31.6 |
| 5,914,806 A | 6/1999 | Gordon II et al. .......... 359/296 |
| 5,922,118 A | 7/1999 | Johnson et al. ............. 106/31.6 |
| 5,964,935 A | 10/1999 | Chen et al. .................. 106/401 |
| 5,968,243 A | 10/1999 | Belmont et al. ......... 106/31.65 |
| 6,042,643 A | 3/2000 | Belmont et al. ............. 106/472 |
| 6,068,688 A | 5/2000 | Whitehouse et al. .... 106/31.65 |
| 6,103,380 A | 8/2000 | Devonport ................... 428/403 |
| 6,150,433 A | 11/2000 | Tsang et al. ................. 523/160 |
| 6,221,932 B1 | 4/2001 | Moffatt et al. .............. 523/160 |
| 6,440,207 B1 * | 8/2002 | Schulz ........................ 106/412 |
| 2003/0019398 A1 * | 1/2003 | Komatsu et al. ............. 106/412 |
| 2003/0027071 A1 * | 2/2003 | Tazawa et al. ......... 430/108.23 |

FOREIGN PATENT DOCUMENTS

| | | | |
|---|---|---|---|
| EP | 0 481 449 A2 | 4/1992 | ........... C09D/11/02 |
| EP | 0 484018 | 5/1992 | ........... C09B/47/20 |
| EP | 0 661 350 A1 | 7/1995 | ........... C09B/1/514 |
| EP | 0 677 556 A2 | 10/1995 | ........... C09B/67/08 |
| EP | 0 688 836 A2 | 12/1995 | ........... C09D/11/02 |
| EP | 1 174 477 A1 | 1/2002 | ........... C09D/11/00 |
| GB | 1170895 | 11/1969 | ........... C09B/47/08 |
| JP | 11-92686 | 4/1999 | ............. C09C/1/56 |
| WO | WO 98/12263 | 3/1998 | ........... C09B/43/16 |
| WO | WO99/23174 | 5/1999 | ............. C09C/1/56 |
| WO | WO99/63007 | 12/1999 | ............. C09C/1/56 |
| WO | WO00/05313 | 2/2000 | ............. C09C/3/10 |
| WO | WO00/22051 | 4/2000 | ............. C09C/1/56 |
| WO | WO00/43446 | 7/2000 | ............. C08K/9/06 |
| WO | WO00/68321 | 11/2000 | ............. C09C/3/10 |
| WO | WO01/51566 | 7/2001 | ............. C09C/3/10 |

OTHER PUBLICATIONS

JP06287462 A to Mitsui Toatsu Chem Inc., Publication Date Oct. 11, 1994 Abstract Only (from Database WPI, Week 199445, AN 1994–363774).
JP11246806 A to Tokyo Ink Mfg. Co. Ltd., Publication Date Sep. 14, 1999 Abstract Only (from Patent Abstracts of Japan).
International Search Report for PCT/US02/21523, mailed Sep. 10, 2002.

* cited by examiner

*Primary Examiner*—Mark L. Bell
*Assistant Examiner*—Veronica F. Faison

(57) ABSTRACT

The present invention describes an ink composition comprising a liquid vehicle and a modified colored pigment. The modified colored pigment comprises the product of a colored pigment having at least one leaving group and a treating agent. The modified colored pigments are also disclosed, as are processes for producing them.

84 Claims, No Drawings

INK COMPOSITIONS COMPRISING MODIFIED COLORED PIGMENTS AND METHODS FOR PREPARING THE SAME

BACKGROUND OF THE INVENTION

1. Field of the Invention

The present invention relates to ink compositions comprising a liquid vehicle and a modified colored pigment. The modified colored pigment comprises the product of a colored pigment having at least one leaving group and a treating agent. The present invention further relates to the modified colored pigments and to processes for preparing them.

2. Description of the Related Art

In general, an ink composition consists of a colorant, such as a dye or pigment, and a liquid vehicle, which functions as a carrier. Pigments offer advantages over dyes, including print durability and lightfastness. However, pigments alone are generally not readily dispersible in liquid vehicles. Thus, dispersants are used to provide stable pigment-based ink compositions.

Colored pigments have been modified in order to obtain improved pigment performance. For example, U.S. Pat. No. 3,981,734 discloses the use of a stabilizing compound of the formula Pc-(X—A)$_n$, wherein Pc is metallized or unmetallized phthalocyanine radical, X is O,S, or —NH—, and A is 4–20 carbon straight or branched chain alkyl, an unsubstituted aryl, or an aryl substituted by halogen, trifluoromethyl, alkyl, or alkoxy. The modified pigments are shown to improve the stability of unmodified phthalocyanine pigments towards phase transformations.

Recently, modified colored pigments have also been developed which provide ink compositions with improved properties, such as dispersibility. The methods of modification involve the reaction of a pigment with a diazonium treating agent. For example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like.

While these efforts provide modified colored pigments with improved properties, there remains a need for improved pigment-based ink compositions.

SUMMARY OF THE INVENTION

The present invention relates to an ink composition comprising a liquid vehicle and a modified colored pigment. The modified colored pigment comprises the product of: a) a colored pigment having at least one leaving group, wherein the leaving group is selected from the group consisting of: halogens, substituted or unsubstituted alkyl or aryl sulfonates, substituted or unsubstituted acylates, substituted or unsubstituted benzoates, and mixtures thereof, and b) a treating agent having the formula B-R-Q, wherein B is a nucleophilic group, R is an alkylene or arylene group, and Q is an ionic or ionizable group. The present invention further relates to the modified colored pigment itself, as described herein.

The present invention also relates to an ink composition comprising a liquid vehicle and a modified colored pigment. In this embodiment, the modified colored pigment comprises the product of: a) a colored pigment having at least one leaving group, wherein the leaving group is selected from the group consisting of: halogens, substituted or unsubstituted alkyl or aryl sulfonates, substituted or unsubstituted acylates, substituted or unsubstituted benzoates, and mixtures thereof, and b) a treating agent having the formula B-R-AO, wherein B is a nucleophilic group, R is bond, an alkylene group, or an arylene group, and AO is an alkylene oxide group. The present invention further relates to the modified colored pigment itself, as described herein.

The present invention also relates to an ink composition comprising a liquid vehicle and a modified colored pigment. In this embodiment, the modified colored pigment comprises the product of: a) a colored pigment having at least one leaving group; and b) a sulfite treating agent. The invention further relates to the modified pigment itself.

The present invention further relates to a process for preparing a modified colored pigment comprising the steps of: a) combining, in any order, a colored pigment having at least one leaving group, a treating agent having at least one nucleophilic group, a solvent A, and a solvent B; and b) heating for a time and a temperature sufficient to produce a modified colored pigment. In this process, solvent A is a non-solvent for the colored pigment whereas solvent B is a solvent for the colored pigment. The treating agents are described herein. When the treating agent is a sulfite treating agent, solvent B is optional. In one embodiment, a base is also combined in step a).

It is to be understood that both the foregoing general description and the following detailed description are exemplary and explanatory only and are intended to provide further explanation of the present invention, as claimed.

DETAILED DESCRIPTION OF THE INVENTION

The present invention relates to ink compositions comprising a liquid vehicle and a modified colored pigment, as well as the modified colored pigment itself and processes for preparing the modified colored pigment. The modified colored pigment comprises the product of a colored pigment having at least one leaving group and a treating agent.

Ink compositions can be categorized into various classifications. These include, for example, printing inks, ultraviolet cure inks, ball-point pen inks, and stamp pad or marking inks. As described above, in general, an ink composition consists of a vehicle, which functions as a carrier, and a colorant such as a dye or pigment. Additives and/or cosolvents can be incorporated in order to adjust the ink to attain the desired performance.

The vehicle for the ink compositions of the present invention may be either an aqueous or a non-aqueous vehicle. Preferably, the vehicle is an aqueous vehicle and the ink composition is an aqueous ink composition. The ink composition of the present invention is preferably an inkjet ink composition.

The ink compositions of the present invention comprise a modified colored pigment. This composition can be formed with a minimum of additional components (additives and/or cosolvents) and processing steps. The modified colored pigment is present in the ink compositions in an amount effective to provide the desired image quality (for example, optical density) without detrimentally affecting the performance of the ink. For example, typically, the modified colored pigment will be present in an amount ranging from about 0.1% to about 20% based on the weight of the ink. It is also within the bounds of the present invention to use a formulation containing a mixture of the modified colored pigments described herein and unmodified pigments, other modified pigments, or both.

Suitable additives may also be incorporated into these ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, and the like. The amount of a particular additive will vary depending on a variety of factors but are generally present in an amount ranging between 0% and 40%.

Additionally, the ink compositions of the present invention may further incorporate dyes to modify color balance and adjust optical density. Such dyes include food dyes, FD&C dyes, acid dyes, direct dyes, reactive dyes, derivatives of phthalocyanine tetrasulfonic acids, including copper phthalocyanine derivates, tetra sodium salts, tetra ammonium salts, tetra potassium salts, tetra lithium salts, and the like.

The ink compositions can be purified and/or classified using methods such as those described below for the modified pigments and dispersions thereof. An optional counterion exchange step can also be used. In this way, unwanted impurities or undesirable large particles can be removed to produce an ink with good overall properties.

The ink compositions of the present invention comprise a modified colored pigment. In general, the modified colored pigment comprises the product of a colored pigment having at least one leaving group and a treating agent. For the purposes of the present invention, a leaving group is any functional group which is capable of being replaced or substituted by another group. As used herein, a carboxylic acid group (with the general structure —COOH), or esters or amides thereof (with general structures of —COOR and —CONR$_2$ wherein R is an alkyl or aryl group), are not leaving groups for the purposes of the present invention. Examples of leaving groups include, but are not limited to, halogens, sulfonates (—OSO$_2$—R), and acylates (—O—COR).

The colored pigment to be modified may be chosen from a wide range of conventional colored pigments, provided that such colored pigment have at least one leaving group. Preferably, the pigment is a white pigment, a black pigment, a blue pigment, a brown pigment, a cyan pigment, a green pigment, a violet pigment, a magenta pigment, a red pigment, or a yellow pigment, or shades or combinations thereof. Suitable classes of colored pigments include, for example, anthraquinones, phthalocyanine blues, phthalocyanine greens, diazos, monoazos, pyranthrones, perylenes, heterocyclic yellows, quinacridones, diketopyrolo-pyroles, and (thio)indigoids. Preferably, the colored pigment has a leaving group selected from the group consisting of: halogens, substituted or unsubstituted alkyl or aryl sulfonates, substituted or unsubstituted acylates, substituted or unsubstituted benzoates, and mixtures thereof. More preferred are colored pigments having a halogen as the leaving group. Thus, more preferred colored pigments are halogenated colored pigments. The halogen is preferably chlorine, bromine, or a combination of both. Of the halogenated colored pigments, most preferred are Pigment Green 7, Pigment Green 36, and Pigment Yellow 138.

The colored pigments may be prepared by any method known to one skilled in the art. Colored pigment without any leaving groups may be further processed using conventional techniques such as halogenation, sulfonation, acylation or benzoylation, to produce a colored pigment having at least one leaving group.

The colored pigments having at least one leaving group will typically have a wide range of BET surface areas, as measured by nitrogen adsorption. Preferably, the colored pigment has a surface area equal to or greater than 10 m$^2$/g, and more preferably equal to or greater than 100 m$^2$/g, thereby corresponding to a smaller primary/aggregate particle size. If the preferred higher surface area of the pigment (thereby corresponding to a smaller particle size) is not readily available, it is well recognized by those skilled in the art that the pigment may be subjected to conventional size comminution or reduction techniques, such as ball or jet milling, to reduce the pigment to the desired particle size.

In one embodiment, the modified colored pigments used in the ink composition of the present invention comprise the product of a colored pigment having at least one leaving group and a treating agent having the formula B-R-Q. B is a nucleophilic group and is preferably OH, SH or NR$_2$', wherein R' is independently hydrogen, a C$_1$–C$_{12}$ alkyl group, or an aryl group. R is an alkylene or arylene group to which both B and Q are attached. Q is an ionic or ionizable group.

An ionic group is either anionic or cationic and is associated with a counterion of the opposite charge including inorganic or organic counterions such as Na$^+$, K$^+$, Li$^+$, NH$_4^{+}$, NR"$_4^+$ acetate, NO$_3^-$, SO$_4^{-2}$, R"SO$_3^-$, R"OSO$_3^-$, OH$^-$, and Cl$^-$, where R" represents hydrogen or an organic group such as a substituted or unsubstituted aryl and/or alkyl group. An ionizable group is one that is capable of forming an ionic group in the medium of use. Ionic groups include those described in U.S. Pat. No. 5,698,016, the description of which is fully incorporated herein by reference.

The group Q can be a negatively charged ionic group, which may be generated from a group having an ionizable substituent that can form an anion, such as an acidic substituent, or may be the anion in the salt of an ionizable substituent. Representative examples of ionic groups include —COO$^-$, —SO$_3^-$, —OSO$_3^-$, —HPO$_3^-$, —OPO$_3^{-2}$, and —PO$_3^{-2}$. Representative examples of ionizable groups include —COOH, —SO$_3$H, —PO$_3$H$_2$, —R"SH, —R"OH, and —SO$_2$NHCOR", where R" represents hydrogen or an organic group such as a substituted or unsubstituted aryl and/or alkyl group.

The group Q can also be a positively charged ionic group, which may be generated from an amine by protonation to form an ammonium group in acidic media. In addition, Q may be a quaternary ammonium group (—NR"$_3^+$) or quaternary phosphonium group (—PR"$_3^+$), where R" represents hydrogen or an organic group such as a substituted or unsubstituted aryl and/or alkyl group. These include quaternized cyclic ammonium ions and quaternized aromatic ammonium ions, such as N-methyl-pyridyl.

Preferably, the ionic or ionizable group Q is a carboxylic acid group or salt thereof, a sulfonic acid group or salt thereof, a phosphonic acid group or salt thereof, an amino group or salt thereof, or a quaternary ammonium group. Particularly preferred species are —COO$^-$ and —SO$_3^-$. Most preferred are carboxylic acid groups and sulfonic acid groups, and salts thereof.

In another embodiment of the present invention, the treating agent has the formula B-R-AO. B is as described above, R is a bond, an alkylene group, or an arylene group, and AO is an alkylene oxide group. The alkylene oxide group can be capped either by a hydrogen or an alkyl group. Preferably, the alkylene oxide group is polymeric and comprises alkylene oxide groups having from about 1 to about 12 carbons such as, but not limited to, —CH$_2$—CH$_2$—O—, —CH(CH$_3$)—CH$_2$—O—, —CH$_2$—CH(CH$_3$)—O—, and —CH$_2$—CH$_2$—CH$_2$—O—. Thus, preferably, AO is a polymeric group comprising ethylene oxide, propylene oxide, or both. The polyalkylene oxide can also be capped by either a hydrogen or an alkyl group. Examples polyalkylene oxides include, but are not limited to, polyethylene oxide (PEO), polyethylene oxide monomethyl ether, polypropylene oxide (PPO), polypropylene oxide mono methyl ether, and poly (ethylene oxide-propylene oxide) (EO-PO polymers).

In another embodiment, the treating agent is a sulfite treating agent. Preferably, the sulfite treating agent is a reagent which comprises a sulfite anion and at least one counterion such as, for example, Na$^+$, K$^+$, Li$^+$, Cs$^+$ and NH$_4^+$. Examples of sulfite treating agents include, but are not limited to, sodium sulfite, potassium sulfite, and sodium bisulfite. Most preferred is sodium sulfite.

The modified colored pigments described above may be further modified using the methods described in U.S. Pat. Nos. 5,554,739, 5,707,432, 5,837,045, 5,851,280, and 6,042,643, and PCT Publication WO 99/23174, the descriptions of which are fully incorporated herein by reference, such that organic groups are attached to the pigment. More than one type of attached organic group can be used. In this way, a colored pigment having at least one leaving group may further have attached organic groups which are not leaving groups but which may provide additional benefits in the ink composition.

The relative amounts of colored pigment and treating agent used to prepare the modified colored pigments in the ink compositions of the present invention will vary depending on, for example, the type of colored pigment, the amount of leaving groups, and the reactivity of the treating agent. If you consider a colored pigment to be comprised of insoluble discrete molecules, the preferred molar ratio of treating agent to insoluble molecule in the present invention is generally between 1:10 and 10:1. More preferably, the ratio is between 1:4 and 4:1. In addition, considering a colored pigment to be comprised of insoluble molecules which further comprise leaving groups, the preferred molar ratio of treating agent to leaving group is generally much less than 1:1 and is more preferably between 1:2 and 1:10. Therefore, the resulting modified colored pigments, which comprise the product of the colored pigments and treating agents, will have a certain amount of leaving groups remaining. The remaining amount of leaving groups will depend on the amount of treating agent added, the relative level of leaving groups for the starting colored pigment, and the conditions used to prepare the modified colored pigment, as further described in more detail below. In general, the remaining amount of leaving groups of the modified colored pigments will be between about 50% and 99% of the amount of leaving groups of the colored pigments from which it was prepared.

The modified colored pigments described herein may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art. Dispersions of the modified colored pigments may be further purified or classified to remove impurities and other undesirable free species which can co-exist in the dispersion as a result of the manufacturing process. For example, the dispersion can be purified to remove any undesired free species, such as unreacted treating agent. Known techniques of ultrafiltration/diafiltration using a membrane or ion exchange may be used to purify the dispersion and remove a substantial amount of free ionic and unwanted species. An optional exchange of counterions step may also occur in the purification process whereby the counterions that form a part of the modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, Na$^+$, K$^+$, Li$^+$, NH$_4^+$, Ca$^{2+}$, Mg$^{2+}$, Cl$^-$, NO$_3^-$, NO$_2^-$, acetate, and Br$^-$.

The present invention further relates to a process for preparing modified colored pigments. In general, the modified colored pigments of the ink compositions of the present invention can be prepared by any method known to one skilled in the art. In one embodiment of the present invention, the process to prepare these modified colored pigments comprises the steps of: a) combining a colored pigment having at least one leaving group, a treating agent having at least one nucleophilic group, a solvent A, and a solvent B; and b) heating for a time and to a temperature sufficient to produce a modified colored pigment. It will be recognized by one skilled in the art that the process may also be accompanied by a change in pressure in order to achieve the desired temperature. The leaving groups are preferably as described above and the treating agents are preferably a sulfite treating agent, a treating agent having the formula B-R-Q, or a treating agent having the formula B-R-AO, where B, R, Q, and AO are as described above.

Solvent A can be any non-solvent system that will not substantially dissolve the colored pigment, even upon heating. Examples of solvent A include, but are not limited to, water, alcohols, ethers, and ketones. Preferably, solvent A is water, methanol, ethanol, iso-propanol, glycol, or mixtures thereof In comparison, solvent B is a solvent system that will, at least partially, dissolve the colored pigment, particularly with heating. Preferably, solvent B is dimethylformamide (DMF). In a preferred process, the ratio of solvent A to solvent B is between about 1:4 and about 4:1, and is preferably 1:1.

A base, such as an alkaline earth metal hydroxide, alkali metal hydroxide, alkali metal carbonate, or alkali metal bicarbonate, can further be combined with the components in step a). in order to, for example, increase the solubility of the treating agent. Examples of bases include, but are not limited to, LiOH, KOH, NaOH, K$_2$CO$_3$, KHCO$_3$, Na$_2$CO$_3$, or NaHCO$_3$.

The components in step a) of the process can be combined in any order. For example, in one preferred process, the treating agent is combined with solvent A. A base, as described above, may further be added. In addition, this combination may be preheated. The base and preheating provide additional benefits to the process of the present invention, such as, for example, assisting in solubilizing the treating agent.

Another preferred combination in the process for preparing the modified colored pigments is to combine the colored pigment and solvent B in step a). This combination may further be preheated to assist in at least partially dissolving the colored pigment in solvent B.

In another embodiment of the present invention, the process for preparing the modified colored pigments comprises the steps of: a) combining a colored pigment having at least one leaving group, a sulfite treating agent, and a solvent A; and b) heating for a time and to a temperature sufficient to produce a modified colored pigment. Solvent A is as described above. In this process, the components in step a) can be combined in any order.

While not wishing to be bound by any theories, it is believed that the treating agent will react with the colored pigment having at least one leaving group. In this process, the leaving group is replaced by the treating agent. If the amount of treating agent is less than the amount of leaving groups, the resulting modified colored pigment will have remaining leaving groups, as described above. Alternatively, if the amount of treating agent exceeds the amount of available leaving groups, and the solvent system is such that the pigment does not substantially dissolve, the resulting modified colored pigment is a surface modified colored pigment. Thus, the treating agent groups replace primarily the leaving groups at or near the surface of the colored pigment. Since this treating agent comprises an ionic or ionizable group Q, the resulting modified colored pigment also has increased dispersibility in an aqueous ink vehicle. Further, one skilled in the art, would expect that the presence of a dispersing group would increase the solubility of the insoluble molecules that comprise the colored pigment. Contrary to this expectation, the modified colored pigments of the present invention and, in particular, those prepared by the process as described above, have been found to contain no soluble colored species, such as dyes. The resulting products are modified colored pigments which can be used in ink formulations, especially an aqueous ink formulation such as an inkjet ink formulation.

The process described herein can be monitored using any technique known to one skilled in the art. For example, elemental analysis can be used to detect the presence of elements specific to the treating agent. Thus, if the treating agent contains sulfur, elemental analysis can be used to detect the presence of increased levels of sulfur in the resulting modified colored pigment. In addition, if desired, any loss in the level of leaving groups may also be measured. The combination of a reduction in amount of leaving groups and the presence of elements from the treating agent would lend support for the mechanism described above.

As described above, the modified colored pigments can be used in ink compositions and, in particular, aqueous inkjet ink compositions. These pigments can be incorporated into the ink compositions using any technique known to one skilled in the art. For example, the modified colored pigment can be added as a dry powder to the liquid vehicle of the ink composition and mixed to form a dispersion of the colored pigment. These modified pigment products generally have improved dispersibility in the vehicle, thus reducing or eliminating such steps as milling and the like. Alternatively, the vehicle of the ink composition may be used or added during the preparation of the modified pigment product, thus eliminating the need for a dispersion step. The dispersions and ink compositions can be further purified as described above to remove, for example, soluble species or undispersed components.

The present invention will be further clarified by the following examples which are intended to be only exemplary in nature.

EXAMPLES

Example 1

Potassium hydroxide (0.9 g, 16 mmol, available from Aldrich Chemical, Milwaukee, Wis.) and 4-mercaptophenol (1 g, 7.9 mmol, available from Aldrich Chemical, Milwaukee, Wis.) were stirred in N,N-dimethyl-formamide (DMF, 30 g, available from Aldrich Chemical, Milwaukee, Wis.) at 100° C. for 10 minutes before 5 grams of Pigment Green 36 (approximately 3.2 mmol, available from Sun Chemical, Cincinnati, Ohio) were added. The mixture was allowed to stir at 125° C. for 14 hrs and then allowed to cool to room temperature. Solid was collected by vacuum filtration which was first washed with DMF twice, and then refluxed in ethanol for 2 hours. Ethanol was removed by vacuum filtration, and the remaining solid was washed with ethyl ether twice. The resulting product was a modified green pigment comprising the product of Pigment Green 36 and 3-mercaptophenol.

The resulting modified green pigment was dried and analyzed for sulfur content by combustion analysis. The modified green pigment was found to have 3.9% sulfur, which represents approximately 90% of the amount of 3-mercaptophenol added. The 5 grams of Pigment Green 36 represents approximately 44.8 mmol of halogens (approximately 14 mmol halogen per mmol of pigment). The modified green pigment contained 1.2 mmol/gr of sulfur based on elemental analysis. Thus, assuming the halogens (i.e., the leaving groups) are replaced during the process, the modified green pigment should also contain 7.76 mmol/gr of halogens, or 87% of the halogens of the starting Pigment Green 36.

Example 2

Potassium hydroxide (1.51 g, 27 mmol) and 3-mercaptobenzoic acid (2 g, 13 mmol, available from Aldrich Chemical, Milwaukee, Wis.) were stirred in 70 mL of DMF at 100° C. for 3 hours before 10 grams of Pigment Green 36 (approximately 6.4 mmol) were added. The mixture was allowed to stir at 125° C. for 60 hrs, and was then allowed to cool to room temperature. Solid was collected by vacuum filtration and was washed sequentially with DMF, tetrahydrofuran, ethyl ether, and ethyl acetate. After drying, 11 grams of a green pigment was collected, which was a modified green pigment comprising the product of Pigment Green 36 and 3-mercapto-benzoic acid.

When 10 gram of this modified green pigment was added to 80 g of deionized water, a green dispersion was obtained. This disperison was then sonicated using a sonication probe (available from Misonix Inc. Farmingdale, N.Y.) for 10 minutes. The dispersion was sequentially filtered through a 1.6 micron and a 0.7 micron syringe filter (available from Whatman and manufactured by Arbor Technologies, Inc. Arm Arbor, Mich.). No build up of back pressure was observed, indicating little to no plugging of the filters from the presence of poorly dispersed pigment.

The physical properties of this dispersion are shown in Table 1.

TABLE 1

| % Solid | pH | Viscosity | Zeta-potential |
| --- | --- | --- | --- |
| 10.2 | 7 | 1.3 cP | −12 mV in HCl −26 mV in KCl |

The viscosity was measured using a Shell-cup available from Norcross Corp, Newton Mass. Zeta potential was determined using Zeta Plus (available from Brookhaven Instrument Corp. in Holtsville, N.Y.) in two 1 mM KCl and 1 mM HCl electrolyte solutions.

The stability of the dispersion was also studied by heat aging the material at 70° C. for 24 hours. The mean volume particle size of the dispersion was measured by the dynamic light scattering method using a MICROTRAC Ultrafine Particle Analyzer (available from Honeywell, Minneapolis, Minn.) both before and after heat aging. Very little change in particle size was observed. The results are shown in Table 2.

TABLE 2

| Condition | Mean volume particle size |
|---|---|
| Initial | 145 nm |
| Heat aged | 139 nm |

In order to demonstrate that the modified green pigment of this example was a pigment and did not contain soluble colored species such as dyes, the dispersion was diafiltered through different molecular weight cut off (MWCO) membranes (using Microsep membranes available from Pall Filtron Corp. Ann Arbor, Mich.), through which soluble colored species such as dyes would be expected to pass. The resulting filtrates were examined for the presence of color. The results are shown in Table 3.

TABLE 3

| MWCO (dalton) | Filtrate |
|---|---|
| 5,000 | Clear solution |
| 50,000 | Clear solution |
| 100,000 | Clear solution |
| 300,000 | Very light green solution |

The results show that the modified green pigment prepared in this example did not contain soluble colored species since very little color resulted in the filtrates, even using a very high MWCO membrane. The product is a pigment, which is further supported by the particle size and zeta-potential results shown above.

Approximately 50 grams of the dispersion was dialyzed using a 12,000 MWCO dialysis membrane bag (Spectra/Por, available from Spectrum, Rancho Dominguez, Calif.) with 2 liters of deionized water 3 times for a total of 6 liters. The resulting green ink composition after dialysis was dried down and was found to contain 2.56% sulfur based on elemental analysis. This represents 62% of the amount of 3-mercaptobenzoic acid added.

Example 3

Potassium hydroxide (4.37 g, 78 mmol) and 3-mercaptopropionic acid (4.14 g, 39 mmol, available from Aldrich Chemical, Milwaukee, Wis.) were stirred in 100 mL of DMF and 100 mL of deionized water at 90° C. for 10 minutes before 30 grams of Pigment Green 36 (about 19.3 mmol) were added. The mixture was stirred at 125° C. for 60 hrs before it was allowed to cool to room temperature. The solid was collected by vacuum filtration and was washed with the following solvents: DMF, tetrahydrofuran, ethyl ether, and ethyl acetate. After drying, 38 grams of a green pigment was collected, which was a modified green pigment comprising the product of Pigment Green 36 and 3-mercaptopropionic acid.

When 20 gram of this modified green pigment was added to 80 g of deionized water, a very light green dispersion was obtained. The mixture was then sonicated for 30 minutes and a dark green dispersion was obtained. This dispersion was then dialyzed to remove soluble impurities using a 12,000 MWCO dialysis membrane bag from Spectrum with 2 liters of DI-water 3 times for a total of 6 liters. The dispersion after dialysis was sonicated for an additional 30 minutes and filtered, and the filtrate was centrifuged at 5,000 rpm for 30 minutes using a type 19 rotor on a Beckman L-80 Ultra-Centrifuge (available from Beckman Inc, Fullerton, Calif.). The resulting green ink composition was decanted.

The mean volume particle size was 99 nm, and the solids content was 10.5%. Zeta potential of this material was −8 mv in 1 mM HCl and −17 mv in 1 mM KCl. Similar studies as those in Example 2 showed that the green dispersion in this example did not contain soluble colored species.

Example 4

The procedure described in Example 3 was followed, except using 3-mercaptobenzoic acid in place of the 3-mercapto-propionic acid. The resulting green dispersion, which contained the modified green pigment comprising the product of Pigment Green 36 and 3-mercaptobenzoic acid, had a mean volume particle size of 110 nm and did not contain any soluble colored species, as determined using a procedure similar to that described in Example 2.

Example 5

To a Parr Pressure Vessels reactor (available from Parr Instrument, Moline, Ill.) equipped with a magnetic stirrer was added 10 grams of Pigment Green 36, 50 grams of sodium sulfite (available from Aldrich Chemical, Milwaukee, Wis.), and 200 mL of deionized water. The reactor was then sealed and heated to 160° C. for 16 hrs using an oil bath. The mixture was cooled to room temperature and solid was separated by vacuum filtration. The filter cake was then washed five times with boiling water to remove any soluble impurities. The resulting pigment was a modified green pigment comprising the product of Pigment Green 36 and sodium sulfite.

Elemental analysis showed that this modified green pigment contained 1000 ppm of Na (measure by combustion analysis) and 1400 ppm of sulfur. This modified green pigment can be readily dispersed in water or other aqueous vehicles using procedures similar to those described in the previous examples.

Example 6

A procedure similar to that described in Example 5 was followed. Thus, to a Pall reactor equipped with a magnetic stirrer was added 10 grams of Pigment Green 36, 50 grams of sodium sulfite, 0.5 g of $CuSO_4$ (available from Aldrich Chemical, Milwaukee, Wis.), and 200 mL of deionized water. The reactor was then sealed and heated to 180° C. for 16 hrs using an oil bath. The mixture was cooled to room temperature and solid was separated by vacuum filtration. The filter cake was then washed five times with boiling water to remove any soluble impurities. The resulting pigment was a modified green pigment comprising the product of Pigment Green 36 and sodium sulfite.

Elemental analysis showed that the modified green pigment contained 3100 ppm of Na and 4300 ppm of sulfur. This modified green pigment can be readily dispersed in water or other aqueous vehicles using procedures similar to those described in the previous examples.

Example 7

Potassium hydroxide (9.52 g, 170 mmol) and 3-mercaptopropionic acid (9.22 g, 87 mmol) were stirred in 125 mL of DMF and 125 mL of deionized water at 90° C. for 10 minutes before 30 grams of Pigment Yellow 138

(about 43.5 mmol, available from BASF Corporation, Mount Olive, N.J.) were added. The mixture was stirred at 125° C. for 60 hrs before allowing to cool to room temperature. The solid was collected by vacuum filtration and was washed sequentially with DMF, tetrahydrofuran, ethyl ether, and ethyl acetate. After drying, a yellow pigment was obtained, which was a modified yellow pigment comprising the product of Pigment Yellow 138 and 3-mercaptopropionic.

About 20 gram of this modified yellow pigment was added to 80 g of deionized water. A light yellow dispersion was obtained. The mixture was then sonicated for 30 minutes and a dark yellow dispersion was obtained. This dispersion was dialyzed to remove soluble impurities using a 12,000 MWCO dialysis membrane bag (Spectra/Por, available from Spectrum, Rancho Dominguez, Calif.) with 2 liters of DI-water 3 times for a total of 6 liters. After dialysis, the dispersion was sonicated again for an additional 30 minutes and filtered, and the filtrate was centrifuged at 5,000 rpm for 30 minutes with a Beckman L-80 centrifuge. The resulting yellow dispersion was decanted out.

The mean volume particle size of the yellow dispersion was 125 nm, and the solids content was 6.5%. A procedure similar to that described in Example 2 showed that this yellow dispersion did not contain soluble colored species.

The resulting dispersions described in the examples above are particularly useful in a wide variety of aqueous based applications and, in particular, inkjet ink compositions. The dispersions are expected to provide, when jetted through an inkjet printer onto a suitable substrate, an aesthetically pleasing colored print with good optical qualities.

I claim:

1. An ink composition comprising a liquid vehicle and a modified colored pigment, wherein the modified colored pigment comprises the product of:
    a) a colored pigment having at least one leaving group, wherein the leaving group is selected from the group consisting of: halogens, substituted or unsubstituted alkyl or aryl sulfonates, substituted or unsubstituted acylates, substituted or unsubstituted benzoates, and mixtures thereof; and
    b) a treating agent having the formula B-R-Q, wherein B is a nucleophilic group, R is an alkylene or arylene group, and Q is an ionic or ionizable group.

2. The ink composition of claim 1, wherein the liquid vehicle is an aqueous vehicle.

3. The ink composition of claim 1, wherein the modified colored pigment is a surface modified colored pigment.

4. The ink composition of claim 1, wherein the leaving group is a halogen.

5. The ink composition of claim 4, wherein the halogen is chlorine, bromine, or mixtures thereof.

6. The ink composition of claim 1, wherein the colored pigment is Pigment Green 7, Pigment Green 36, or Pigment Yellow 138.

7. The ink composition of claim 1, wherein the nucleophilic group is OH, SH, or $NR'_2$ and wherein each R' is independently hydrogen, a $C_1$–$C_{12}$ alkyl group, or an aryl group.

8. The ink composition of claim 1, wherein Q is a carboxylic acid group or salt thereof, a sulfonic acid group or salt thereof, a phosphonic acid group or salt thereof, an amino group or salt thereof, or a quaternary ammonium group.

9. The ink composition of claim 1, wherein the ink composition is an inkjet ink composition.

10. An ink composition comprising a liquid vehicle and a modified colored pigment, wherein the modified colored pigment comprises the product of:
    a) a colored pigment having at least one leaving group, wherein the leaving group is selected from the group consisting of: halogens, substituted or unsubstituted alkyl or aryl sulfonates, substituted or unsubstituted acylates, substituted or unsubstituted benzoates, and mixtures thereof; and
    b) a treating agent having the formula B-R-AO, wherein B is a nucleophilic group, R is a bond, an alkylene group, or an arylene group, and AO is an alkylene oxide group.

11. The ink composition of claim 10, wherein the liquid vehicle is an aqueous vehicle.

12. The ink composition of claim 10, wherein the modified colored pigment is a surface modified colored pigment.

13. The ink composition of claim 10, wherein the leaving group is a halogen.

14. The ink composition of claim 13, wherein the halogen is chlorine, bromine, or mixtures thereof.

15. The ink composition of claim 10, wherein the colored pigment is Pigment Green 7, Pigment Green 36, or Pigment Yellow 138.

16. The ink composition of claim 10, wherein the nucleophilic group is OH, SH, or $NR'_2$ and wherein each R' is independently hydrogen, a $C_1$–$C_{12}$ alkyl group, or an aryl group.

17. The ink composition of claim 10, wherein the alkylene oxide group is a polymer comprising ethylene oxide, propylene oxide, or mixtures thereof.

18. The ink composition of claim 10, wherein the ink composition is an inkjet ink composition.

19. An ink composition comprising a liquid vehicle and a modified colored pigment, wherein the modified colored pigment comprises the product of:
    a) a colored pigment having at least one leaving group; and
    b) a sulfite treating agent.

20. The ink composition of claim 19, wherein the liquid vehicle is an aqueous vehicle.

21. The ink composition of claim 19, wherein the modified colored pigment is a surface modified colored pigment.

22. The ink composition of claim 19, wherein the leaving group is selected from the group consisting of: halogens, substituted or unsubstituted alkyl or aryl sulfonates, substituted or unsubstituted acylates, substituted or unsubstituted benzoates, and mixtures thereof.

23. The ink composition of claim 19, wherein the leaving group is a halogen.

24. The ink composition of claim 23, wherein the halogen is chlorine, bromine, or mixtures thereof.

25. The ink composition of claim 19, wherein the colored pigment is Pigment Green 7, Pigment Green 36, or Pigment Yellow 138.

26. The ink composition of claim 19, wherein the sulfite treating agent comprises a sulfite anion and at least one counterion.

27. The ink composition of claim 26, wherein the counterion is $Na^+$, $K^+$, $Li^+$, $Cs^+$, or $NH_4^+$.

28. The ink composition of claim 19, wherein the sulfite treating agent is sodium sulfite.

29. The ink composition of claim 19, wherein the ink composition is an inkjet ink composition.

30. A modified colored pigment comprising the product of:

a) a colored pigment having at least one leaving group, wherein the leaving group is selected from the group consisting of: halogens, substituted or unsubstituted alkyl or aryl sulfonates, substituted or unsubstituted acylates, substituted or unsubstituted benzoates, and mixtures thereof; and b) a treating agent having the formula B-R-Q, wherein B is a nucleophilic group, R is an alkylene or arylene group, and Q is an ionic or ionizable group.

31. The modified colored pigment of claim 30, wherein the modified colored pigment is a surface modified colored pigment.

32. The modified colored pigment of claim 30, wherein the leaving group is a halogen.

33. The modified colored pigment of claim 32, wherein the halogen is chlorine, bromine, or mixtures thereof.

34. The modified colored pigment of claim 30, wherein the colored pigment is Pigment Green 7, Pigment Green 36, or Pigment Yellow 138.

35. The modified colored pigment of claim 30, wherein the nucleophilic group is OH, SH, or $NR'_2$ and wherein each R' is independently hydrogen, a $C_1$–$C_{12}$ alkyl group, or an aryl group.

36. The modified colored pigment of claim 30, wherein Q is a carboxylic acid group or salt thereof, a sulfonic acid group or salt thereof, a phosphonic acid group or salt thereof, an amino group or salt thereof, or a quaternary ammonium group.

37. A modified colored pigment comprising the product of:

a) a colored pigment having at least one leaving group, wherein the leaving group is selected from the group consisting of: halogens, substituted or unsubstituted alkyl or aryl sulfonates, substituted or unsubstituted acylates, substituted or unsubstituted benzoates, and mixtures thereof; and b) a treating agent having the formula B-R-AO, wherein B is a nucleophilic group, R is a bond, an alkylene group, or an arylene group, and AO is an alkylene oxide group.

38. The modified colored pigment of claim 37, wherein the modified colored pigment is a surface modified colored pigment.

39. The modified colored pigment of claim 37, wherein the leaving group is a halogen.

40. The modified colored pigment of claim 39, wherein the halogen is chlorine, bromine, or mixtures thereof.

41. The modified colored pigment of claim 37, wherein the colored pigment is Pigment Green 7, Pigment Green 36, or Pigment Yellow 138.

42. The modified colored pigment of claim 37, wherein the nucleophilic group is OH, SH, or $NR'_2$ and wherein each R' is independently hydrogen, a $C_1$–$C_{12}$ alkyl group, or an aryl group.

43. The modified colored pigment of claim 37, wherein the alkylene oxide group is a polymer comprising ethylene oxide, propylene oxide, or mixtures thereof.

44. A modified colored pigment comprising the product of:

a) a colored pigment having at least one leaving group; and b) a sulfite treating agent.

45. The modified colored pigment of claim 44 wherein the modified colored pigment is a surface modified colored pigment.

46. The modified colored pigment of claim 44, wherein the leaving group is selected from the group consisting of: halogens, substituted or unsubstituted alkyl or aryl sulfonates, substituted or unsubstituted acylates, substituted or unsubstituted benzoates, and mixtures thereof.

47. The modified colored pigment of claim 44, wherein the leaving group is a halogen.

48. The modified colored pigment of claim 47, wherein the halogen is chlorine, bromine, or mixtures thereof.

49. The modified colored pigment of claim 44, wherein the colored pigment is Pigment Green 7, Pigment Green 36, or Pigment Yellow 138.

50. The modified colored pigment of claim 44, wherein the sulfite treating agent comprises a sulfite anion and at least one counterion.

51. The modified colored pigment of claim 50, wherein the counterion is $Na^+$, $K^+$, $Li^+$, $Cs^+$, or $NH_4^+$.

52. The modified colored pigment of claim 44, wherein the sulfite treating agent is sodium sulfite.

53. A process for preparing a modified colored pigment comprising the steps of:

a) combining, in any order, a colored pigment having at least one leaving group, a treating agent having at least one nucleophilic group, a solvent A, and a solvent B, wherein solvent A is a non-solvent for the colored pigment and wherein solvent B is a solvent for the colored pigment; and b) heating for a time and to a temperature sufficient to produce a modified colored pigment.

54. The process of claim 53, wherein the combination of colored pigment, treating agent, solvent A, and solvent B is further combined with a base.

55. The process of claim 54, wherein the base is selected from the group consisting of: alkaline earth metal hydroxides, alkali metal hydroxides, alkali metal carbonates, and alkali metal bicarbonates.

56. The process of claim 54, wherein the base is LiOH, KOH, NaOH, $K_2CO_3$, $KHCO_3$, $NA_2CO_3$, or $NaHCO_3$.

57. The process of claim 53, wherein the treating agent is combined with solvent A in step a).

58. The process of claim 57, wherein the combination of treating agent and solvent A is further combined with a base.

59. The process of claim 58, wherein the base is selected from the group consisting of: alkaline earth metal hydroxides, alkali metal hydroxides, alkali metal carbonates, and alkali metal bicarbonates.

60. The process of claim 58, wherein the base is LiOH, KOH, NaOH, $K_2CO_3$, $KHCO_3$, $Na_2CO_3$, or $NaHCO_3$.

61. The process of claim 58, wherein the combination of treating agent, solvent A, and base is preheated for a time and to a temperature sufficient to dissolve the treating agent.

62. The process of claim 53, wherein the colored pigment is combined with solvent B in step a).

63. The process of claim 62, wherein the combination of colored pigment and solvent B is preheated for a time and to a temperature sufficient to dissolve the colored pigment.

64. The process of claim 53, wherein the ratio of solvent A to solvent B is 1:4 to 4:1.

65. The process of claim 53, wherein the ratio of solvent A to solvent B is 1:1.

66. The process of claim 53, wherein solvent A is selected from the group consisting of:
water, alcohols, ethers, and ketones.

67. The process of claim 53, wherein solvent A is water, methanol, ethanol, iso-propanol, or glycol.

68. The process of claim 53, wherein solvent B is dimethylformamide.

69. The process of claim 53, wherein solvent A is water and solvent B is dimethylformamide.

70. The process of claim 53, wherein the leaving group is selected from the group consisting of: halogens, substituted or unsubstituted alkyl or aryl sulfonates, substituted or unsubstituted acylates, substituted or unsubstituted benzoates, and mixtures thereof.

71. The process of claim 53, wherein the leaving group is a halogen.

72. The process of claim 71, wherein the halogen is chlorine, bromine, or mixtures thereof.

73. The process of claim 53, wherein the treating agent has the formula B-R-Q, wherein B is a nucleophilic group, R is an alkylene or arylene group, and Q is an ionic or ionizable group.

74. The process of claim 73, wherein the nucleophilic group is OH, SH, or $NR'_2$ and wherein each R' is independently hydrogen, a $C_1$–$C_{12}$ alkyl group, or an aryl group.

75. The process of claim 73, wherein Q is a carboxylic acid group or salt thereof, a sulfonic acid group or salt thereof, a phosphonic acid group or salt thereof, an amino group or salt thereof, or a quaternary ammonium group.

76. The process of claim 53, wherein the treating agent has the formula B-R-AO, wherein B is a nucleophilic group, R is a bond, an alkylene group, or an arylene group, and AO is an alkylene oxide group.

77. The process of claim 76, wherein the nucleophilic group is OH, SH, or $NR'_2$ and wherein each R' is independently hydrogen, a $C_1$–$C_{12}$ alkyl group, or an aryl group.

78. The process of claim 76, wherein the alkylene oxide group is a polymer comprising ethylene oxide, propylene oxide, or mixtures thereof.

79. The process of claim 53, wherein the treating agent is a sulfite treating agent.

80. The modified colored pigment of claim 79, wherein the sulfite treating agent comprises a sulfite anion and at least one counterion.

81. The modified colored pigment of claim 80, wherein the counterion is $Na^+$, $K^+$, $Li^+$, $Cs^+$, or $NH_4^+$.

82. The modified colored pigment of claim 80, wherein the sulfite treating agent is sodium sulfite.

83. The process of claim 53, wherein the colored pigment is Pigment Green 7, Pigment Green 36, or Pigment Yellow 138.

84. A process for preparing a modified colored pigment comprising the steps of:
   a) combining, in any order, a colored pigment having at least one leaving group, a sulfite treating agent, and a solvent A, wherein solvent A is a non-solvent for the colored pigment, and
   b) heating for a time and to a temperature sufficient to produce a modified colored pigment.

* * * * *